US011304096B2

(12) United States Patent
Shiraiwa et al.

(10) Patent No.: US 11,304,096 B2
(45) Date of Patent: Apr. 12, 2022

(54) RADIO COMMUNICATION APPARATUS AND METHOD

(71) Applicant: KYOCERA Corporation, Kyoto (JP)

(72) Inventors: Nobuyuki Shiraiwa, Yokohama (JP); Junichi Furumi, Machida (JP); Yuichiro Maki, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 16/876,002

(22) Filed: May 16, 2020

(65) Prior Publication Data
US 2020/0280885 A1    Sep. 3, 2020

Related U.S. Application Data

(63) Continuation of application No. PCT/JP2018/042396, filed on Nov. 16, 2018.

(30) Foreign Application Priority Data

Nov. 17, 2017  (JP) .............................. JP2017-222136

(51) Int. Cl.
*H04W 28/14*   (2009.01)
*H04W 52/02*   (2009.01)

(52) U.S. Cl.
CPC ....... *H04W 28/14* (2013.01); *H04W 52/0241* (2013.01)

(58) Field of Classification Search
CPC . H04W 28/14; H04W 52/0241; H04W 52/02; H04W 80/06; H04L 49/3018; Y02D 30/70

(Continued)

(56) References Cited

U.S. PATENT DOCUMENTS 7,266,612 B1 *  9/2007  Heyman ................. H04L 45/00
                                                      370/229
9,144,072 B2    9/2015  Park
(Continued)

FOREIGN PATENT DOCUMENTS

JP         2015-530817 A    10/2015
JP         2016218660 A     12/2016
(Continued)

OTHER PUBLICATIONS

English translation of JP 2016218660 (Year: 2016).*
(Continued)

*Primary Examiner* — Obaidul Huq
(74) *Attorney, Agent, or Firm* — Studebaker & Brackett PC

(57) ABSTRACT

A LPWA communication apparatus 100 comprises a radio communicator 131 configured to perform a radio communication with a radio communication network 300 by an LPWA scheme, receive, from the radio communication network 300, data transmitted using a UDP, and a transfer controller 132 configured to transfer, to the host device 200, the data received by the radio communicator 131. The radio communicator 131 is configured to resume the radio communication after a predetermined time elapses after transitioning to a power saving state in which the radio communication is stopped, and receive data stored during in the power saving state. The transfer controller 132 is configured to cause a buffer to hold the data received by the radio communicator 131 when data transfer to the host device 200 is impossible when the radio communicator 131 resumes the radio communication.

6 Claims, 6 Drawing Sheets

(58) Field of Classification Search
USPC .................................................. 370/229, 235
See application file for complete search history.

(56) References Cited

U.S. PATENT DOCUMENTS

| | | | |
|---|---|---|---|
| 9,526,103 B2 | 12/2016 | Park | |
| 2014/0204780 A1* | 7/2014 | Yamada | H04L 47/266 370/252 |
| 2016/0100362 A1 | 4/2016 | Palanisamy et al. | |
| 2017/0156048 A1* | 6/2017 | Zeng | H04W 8/02 |
| 2019/0141671 A1* | 5/2019 | Lau | H04W 68/02 |

FOREIGN PATENT DOCUMENTS

| | | | |
|---|---|---|---|
| JP | 2017041714 A | 2/2017 | |
| JP | 2017529020 A | 9/2017 | |

OTHER PUBLICATIONS

Ericsson; "Motivation for work item on NB-IoT operation in unlicensed spectrum"; RAN #75; Mar. 6-9, 2017; pp. 1-10; Dubrovnik, Croatia.

3rd Generation Partnership Project; Technical Specification Group Services and System Aspects; General Packet Radio Service (GPRS) enhancements for; Evolved Universal Terrestrial Radio Access Network (E-UTRAN); 3GPP TS 23.401 V15.1.0; Sep. 2017; pp. 1-397; Release 15; 3GPP Organizational Partners, Valbonne, France.

* cited by examiner

RADIO COMMUNICATION APPARATUS AND METHOD

RELATED APPLICATIONS

The present application is a continuation based on PCT Application No. PCT/JP2018/042396, filed on Nov. 16, 2018, which claims the benefit of Japanese Patent Application No. 2017-222136 (filed on Nov. 17, 2017). The content of which is incorporated by reference herein in their entirety.

TECHNICAL FIELD

The present invention relates to a radio communication apparatus and method.

BACKGROUND ART

The spread of the internet of things (IoT) has increased demands for low-power and low-cost radio communication apparatuses. In order to satisfy such demands, there is an emerging radio communication scheme, low power wide area (LPWA) provided to achieve long-distance communication while suppressing power consumption. A radio communication apparatus that performs LPWA radio communication achieves power saving by stopping radio communication during a period that involves no data communication. Examples of known power saving technologies like these include power saving mode (PSM), extended discontinuous reception (eDRX) defined in the 3rd generation partnership project (3GPP) standards (for example, refer to Non Patent Literature 1).

Furthermore, when a radio communication apparatus is connected to a host device, the host device can communicate with a radio communication network via the radio communication apparatus even when the host device does not include a radio communication function. Since the time required for one communication event is generally short in a radio communication apparatus, it is conceivable to apply a user datagram protocol (UDP) which is a connectionless protocol in the transport layer.

CITATION LIST

Non Patent Literature

Non Patent Literature 1: 3GPP Technical Specifications "3GPP TS 23.401 V15.1.0" September 2017

SUMMARY

A radio communication apparatus according to a first feature is connected to a host device. The radio communication apparatus comprises a radio communicator configured to perform a radio communication with a radio communication network by an LPWA scheme, receive, from the radio communication network, data transmitted using a UDP, and transition to a power saving state in which the radio communication is stopped during a period occurring no data communication, and a transfer controller configured to transfer, to the host device, the data received by the radio communicator. A side of the radio communication network stores data addressed to the radio communication apparatus during a period in which the radio communicator is in the power saving state. The radio communicator is configured to receive the stored data when the radio communication resumes after the transitioning to the power saving state, and the transfer controller is configured to cause a buffer to hold the data received by the radio communicator when data transfer to the host device is impossible when the radio communicator resumes the radio communication.

A method according to a second feature is a method in a radio communication apparatus connected to a host device. The method comprises performing a radio communication with a radio communication network using an LPWA scheme, receiving, from the radio communication network, data transmitted using a UDP, transitioning to a power saving state in which the radio communication is stopped during a period occurring no data communication, storing data addressed to the radio communication apparatus on a side of the radio communication network during a period of the power saving state, receiving the stored data when resuming the radio communication, transferring the received data to the host device, and causing a buffer to hold data received from the radio communication network when data transfer to the host device is impossible.

A radio communication apparatus according to a third feature comprises a radio communicator configured to perform radio communication with a radio communication network according to an LPWA scheme and receive data from the radio communication network. The radio communicator is configured to resume the radio communication after a predetermined time elapses after transitioning to a power saving state in which the radio communication is stopped. The radio communicator is configured to transmit, to the radio communication network, a NAS message that stops or delays transmission of data to the radio communication apparatus, when resuming the radio communication or after resuming the radio communication.

A method according to a fourth feature is a method in a radio communication apparatus. The method comprises performing radio communication with a radio communication network according to an LPWA scheme, receiving data from the radio communication network, resuming the radio communication after a predetermined time elapses after transitioning to a power saving state in which the radio communication is stopped, and transmitting, to the radio communication network, a NAS message that stops or delays transmission of data to the radio communication apparatus, when resuming the radio communication or after resuming the radio communication.

DESCRIPTION OF EMBODIMENTS

Figure 1:
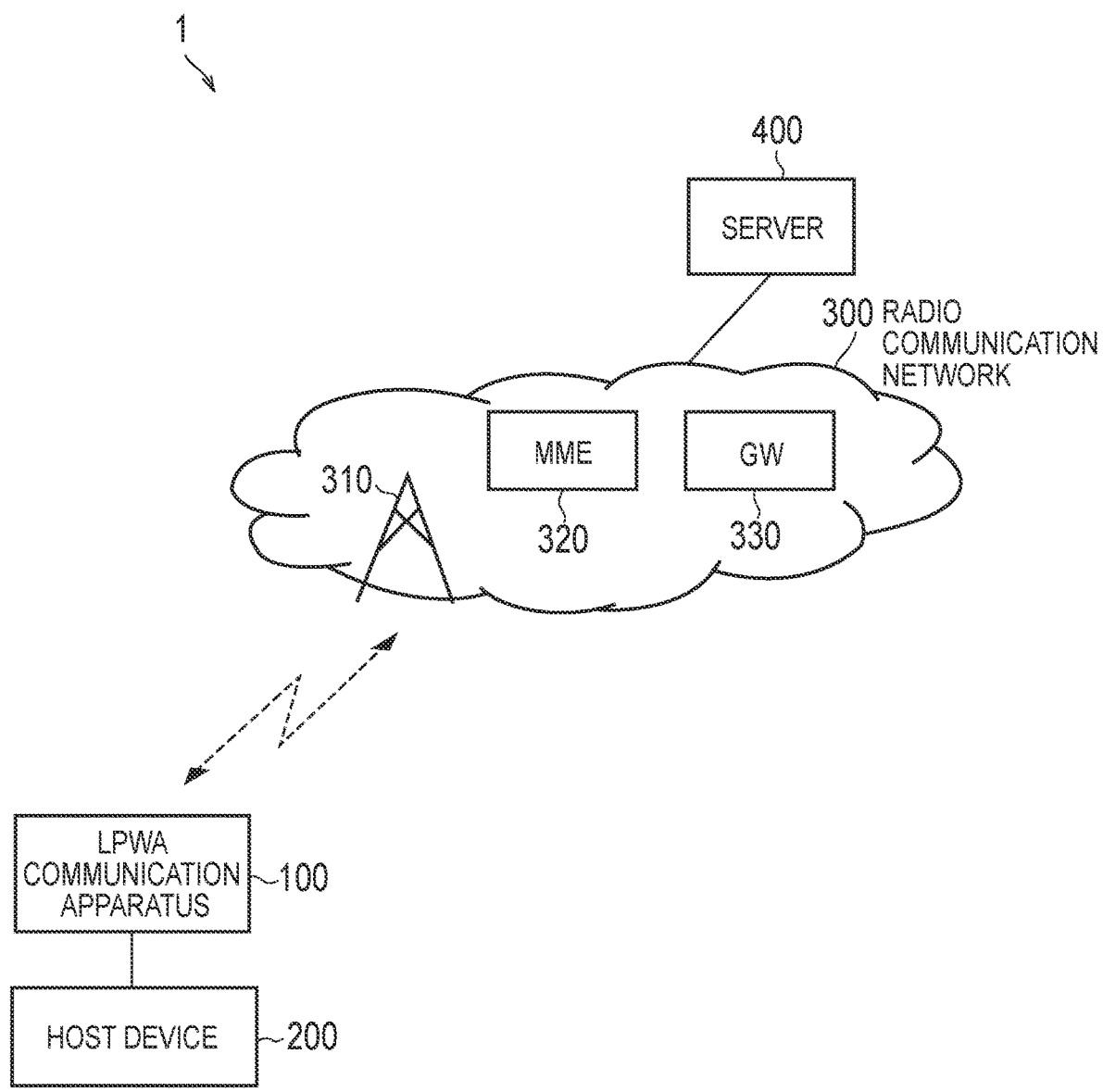
FIG. 1 is a diagram illustrating a configuration of a communication system according to an embodiment.

In a case where the radio communication apparatus described in the Background Art transitions to the power saving state and stops radio communication, data addressed to the radio communication apparatus is stored in the radio communication network while the radio communication apparatus is in the power saving state. The radio communication apparatus receives the stored data from the radio communication network when resuming radio communication.

However, when the radio communication apparatus is connected to a host device, the timing at which the radio communication apparatus resumes radio communication does not always match the timing at which the host device resumes communication. For this reason, there might be a case where the host device is not yet in a data reception enabled state and this disables data transfer from the radio communication apparatus to the host device when the radio communication apparatus resumes radio communication.

In such a case, there is a problem that the radio communication apparatus might discard data that cannot be transferred to the host device. In particular, the UDP does not have a delivery confirmation or retransmission mechanism, and data discarded by the radio communication apparatus would not be retransmitted. Therefore, there is a problem that the occurrence of data that fails to be delivered to the host device would degrade reliability of communication.

Therefore, the present disclosure provides a radio communication apparatus and a method capable of improving communication reliability in a case where a radio communication apparatus is connected to a host device.

An embodiment of the present invention will be described with reference to the drawings. In the description of the drawings, the same or similar portions are denoted by the same or similar reference numerals.

(Communication System Configuration)

FIG. 1 is a diagram illustrating a configuration of a communication system 1 according to an embodiment.

As illustrated in FIG. 1, the communication system 1 includes an LPWA communication apparatus (radio communication apparatus) 100, a host device 200, a radio communication network 300, and a server 400.

The LPWA communication apparatus 100 performs LPWA radio communication with the radio communication network 300. LPWA is a type of radio communication scheme that achieves long-distance communication while suppressing power consumption. The LPWA scheme applied in the embodiment corresponds to one of an enhanced machine type communications (eMTC) scheme or a narrow band (NB)-IoT scheme, defined in the 3GPP standards which is one of the cellular communication standards. eMTC is also referred to as LTE category M1. NB-IoT is also referred to as LTE category NB1.

In order to reduce the cost of the communication apparatus, the eMTC scheme or the NB-IoT scheme limits the frequency bandwidth used for radio communication to a narrow bandwidth and thereby simplifies hardware. Note that the frequency bandwidth available for the NB-IoT radio communication is narrower than the frequency bandwidth available for the eMTC radio communication.

The LPWA communication apparatus 100 is sometimes installed outside the coverage of a normal area of the radio communication network 300, for example, at basements or the like. For this reason, it is allowable to use a coverage enhancement technology for enhancing the coverage by repeatedly transmitting the same signal in both the LPWA schemes, namely the eMTC scheme and the NB-IoT scheme.

In addition, the LPWA communication apparatus 100 achieves power saving by stopping radio communication during a period that involves no data communication. Examples of such power saving technologies include eDRX and PSM defined in the 3GPP standards. eDRX extends the DRX cycle, which is a reception span during which the LPWA communication apparatus 100 performs discontinuous reception, and thereby extends the period (off period) during which the LPWA communication apparatus 100 turns off a receiver so as to achieve power saving. PSM turns the LPWA communication apparatus 10 into a pseudo power-off state (PSM state) in which even discontinuous reception is not performed, so as to achieve power saving. Hereinafter, the PSM state is referred to as a "power saving state". The off period and the PSM state in eDRX are collectively referred to as a "power saving state" in some cases, depending on the radio communication system.

In a case where eDRX is applied, the LPWA communication apparatus 100 in an idle state being a standby state can notice paging, which is a call from the radio communication network 300. In contrast, in a case where PSM is applied, the LPWA communication apparatus 100 in the PSM state cannot notice paging from the radio communication network 300. The radio communication network 300 recognizes whether the LPWA communication apparatus 100 is in the power saving state, and stores data addressed to the LPWA communication apparatus 100 while the LPWA communication apparatus 100 is in the power saving state.

The LPWA communication apparatus 100 is connected to the host device 200. Specifically, the LPWA communication apparatus 100 is directly connected to the host device 200 or indirectly connected to the host device 200 via a cable. The LPWA communication apparatus 100 performs wired communication with the host device 200 using a universal asynchronous receiver/transmitter (UART) scheme or a universal serial bus (USB) scheme, for example.

Examples of the host device 200 include a personal computer (PC), a sensor device, a meter device, or a vending machine. The host device 200 executes IoT applications. The host device 200 connected with the LPWA communication apparatus 100 can communicate with the radio communication network 300 via the LPWA communication apparatus 100 even when the host device 200 does not include a radio communication function.

The radio communication network 300 is a network managed by a telecommunication carrier. In the embodiment, the radio communication network 300 has a configuration based on the 3GPP standards. The radio communication network 300 includes a base station 310, a mobility management entity (MME) 320, and a gateway (GW) 330.

The base station 310 performs LPWA radio communication with the LPWA communication apparatus 100. The base station 310 is connected to the MME 320 and the GW 330.

The MME 320 communicates with the LPWA communication apparatus 100 using non-access stratum (NAS) signaling via the base station 310, and thereby manages a tracking area in which the LPWA communication apparatus 100 is located (that is, an area unit for paging), or the like. The MME 320 recognizes whether the LPWA communication apparatus 100 is in the power saving state.

The GW 330 includes a packet data network gateway (PDN-GW) and a serving gateway (S-GW). The PDN-GW functions as an interface between the radio communication network 300 and an external network (for example, the Internet). The S-GW performs data transfer control between the PDN-GW and the base station 310. The GW 330 works in cooperation with the MME 320 to store data addressed to the LPWA communication apparatus 100 while the LPWA communication apparatus 100 is in the power saving state. When the LPWA communication apparatus 100 returns from the power saving state, the GW 330 transfers data addressed to the LPWA communication apparatus 100 to the LPWA communication apparatus 100 via the base station 310.

The server 400 is connected to an external network (for example, the Internet). The server 400 is a communication destination of the host device 200. The server 400 generates data for an application executed by the host device 200 and transfers the generated data to the host device 200 via the radio communication network 300 and the LPWA communication apparatus 100.

Figure 2:
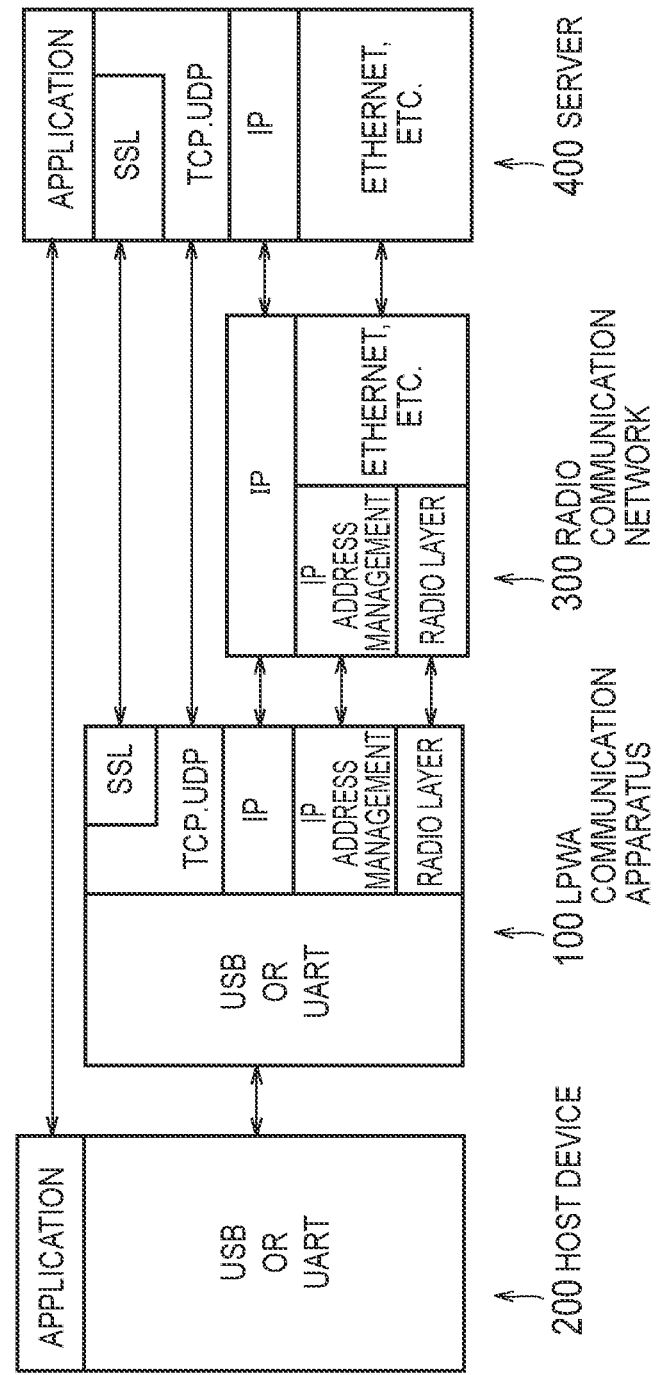
FIG. 2 is a diagram illustrating a protocol stack in a communication system according to the embodiment.

FIG. 2 is a diagram illustrating a protocol stack in the communication system 1 according to an embodiment. Here, a data processing flow from the server 400 to the host device 200 will be described.

As illustrated in FIG. 2, data processed in an application layer of the server 400 undergoes secure sockets layer (SSL) encryption, processed in a transport layer (UDP or TCP) and an IP layer, and then transmitted to the radio communication network 300 by the wired communication such as Ethernet.

The radio communication network 300 receives data from the radio communication network 300 through wired communication such as Ethernet, performs routing processing on the data in the IP layer and IP address management, and transmits the data to the LPWA communication apparatus 100 via a radio layer of the base station 310. The radio layer has a configuration based on the 3GPP standards and includes a physical (PHY) layer, a medium access control (MAC) layer, a radio link control (RLC) layer, a packet data convergence protocol (PDCP) layer, and a radio resource control (RRC) layer.

The LPWA communication apparatus 100 receives data from the radio communication network 300 by wired communication such as Ethernet via the radio layer and IP address management. The LPWA communication apparatus 100 has an IP layer, a transport layer (UDP or TCP), and SSL. The IP layer receives data in the form of IP packets via the radio layer and IP address management, processes the received data at the transport layer (UDP or TCP), and decrypts (decodes) the data using SSL. Subsequently, the LPWA communication apparatus 100 transmits the decrypted data to the host device 200 via USB or UART. The host device 200 uses the application layer to process the data received from the LPWA communication apparatus 100 via USB or UART.

Since the time required for one communication event is short in the LPWA communication apparatus 100, it is preferable to apply the UDP, which is a connectionless protocol, in the transport layer. However, the UDP does not have a delivery confirmation or retransmission mechanism.

(Configuration of LPWA Communication Apparatus)

Figure 3:
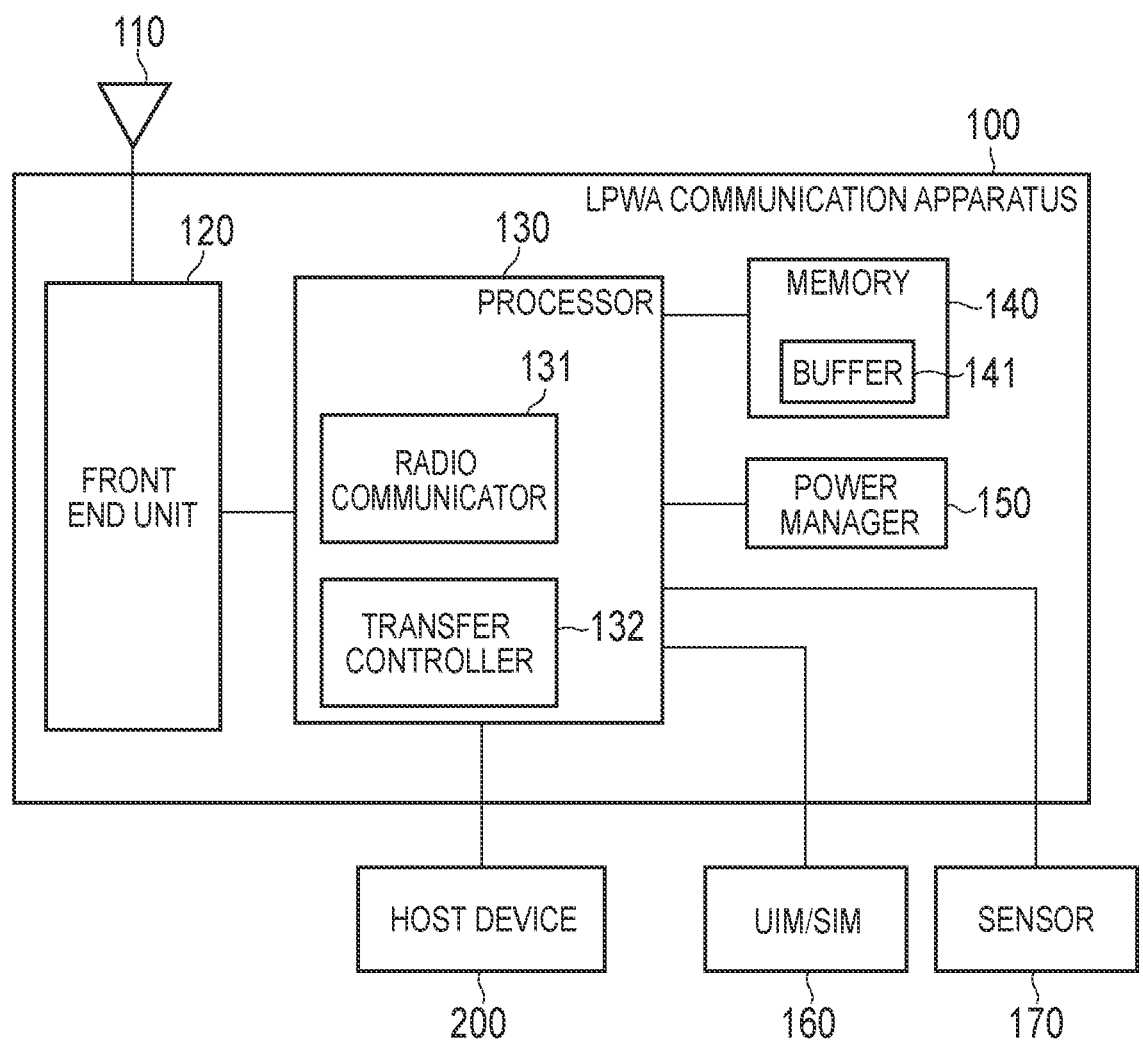
FIG. 3 is a diagram illustrating a configuration of an LPWA communication apparatus according to the embodiment.

FIG. 3 is a diagram illustrating a configuration of the LPWA communication apparatus 100 according to an embodiment.

As illustrated in FIG. 3, the LPWA communication apparatus 100 includes an antenna 110, a front end unit 120, a processor 130, memory 140, and a power management unit 150. The host device 200, a UIM/SIM 160, and a sensor 170 can be connected to the LPWA communication apparatus 100 via an interface (not illustrated). The UIM/SIM 160 stores subscriber information or the like necessary for performing radio communication with the radio communication network 300. The sensor 170 measures temperature, humidity, atmospheric pressure, illuminance, acceleration, geomagnetism, or the like, and outputs measured values. The LPWA communication apparatus 100 may further include a GPS receiver.

The antenna 110 is used for transmitting and receiving a radio signal. The front end unit 120 performs amplification processing, filter processing, or the like on the radio signal received by the antenna 110, converts the radio signal into a baseband signal, and outputs the baseband signal to the processor 130. Further, the front end unit 120 converts the baseband signal input from the processor 130 into a radio signal, performs amplification processing or the like on the signal, and outputs the processed signal to the antenna 110.

The processor 130 performs various types of processing and controls in the LPWA communication apparatus 100. The memory 140 includes volatile memory and non-volatile memory, and stores a program to be executed by the processor 130 and information used for processing by the processor 130. The power management unit 150 includes a battery and its peripheral circuits. The power management unit 150 supplies driving power for the LPWA communication apparatus 100. In a case where the LPWA communication apparatus 100 is connected to the host device 200 by USB, the driving power may be supplied from the host device 200 by USB power supply.

In the embodiment, the processor 130 includes a radio communicator 131 and a transfer controller 132. The memory 140 includes a buffer 141. The radio communicator 131 uses the LPWA scheme to perform radio communication with the radio communication network 300, and receives data transmitted using UDP from the radio communication network 300. The transfer controller 132 transfers the data received by the radio communicator 131 to the host device 200.

In a case where the period involving no data communication continues, each of the front end unit 120 and the radio communicator 131 transitions to a power saving state in which radio communication is stopped. Examples of the period involving no data communication include the time when an idle state continues for a certain period of time (T3324 in 3GPP), or the time when the period involving no data communication continues for a certain period of time after release of the radio connection with the radio communication network 300. Since the power supply to the front end unit 120 or the like can be stopped during the power saving state, it is possible to achieve power saving in the LPWA communication apparatus 100.

The front end unit 120 and the radio communicator 131 resume radio communication after a predetermined time has elapsed from the transition to the power saving state. The predetermined time may be determined by a DRX cycle or a PSM timer value. The DRX cycle and the PSM timer value are information shared by the LPWA communication apparatus 100 and the MME 320. After restarting radio communication after lapse of a predetermined time, the radio communicator 131 receives data stored in the radio communication network 300 (GW 330) during the power saving state.

In a case where data transfer to the host device 200 is impossible when the radio communicator 131 resumes radio communication, the transfer controller 132 transmits to the host device 200 notification indicating that there is data to be transferred to the host device 200. The transfer controller 132 may determine that data transfer to the host device 200 is impossible during the period after transmission of the notification until reception of a communication request from the host device 200. Alternatively, the transfer controller 132 may determine whether data transfer to the host device 200 is enabled on the basis of the power-on state of the host device 200, the application start-up state of the host device 200, or the like.

In a case where data transfer to the host device 200 is impossible, the transfer controller 132 causes the buffer 141 to hold the data received by the radio communicator 131 until data transfer to the host device 200 is enabled. Subsequently, when data transfer to the host device 200 is enabled, the transfer controller 132 transfers the data held in the buffer 141 to the host device 200. For example, after receiving a communication request from the host device 200, the transfer controller 132 may determine that data transfer to the host device 200 is enabled, and may transfer the data held in the buffer 141 to the host device 200.

The communication request from the host device 200 may include information indicating the connection destination of the host device 200 (for example, an identifier or address of the server 400). The transfer controller 132 may store the connection destination of the host device 200 before the transition to the power saving state, and may determine whether the stored connection destination matches the connection destination included in the communication request. The transfer controller 132 may transfer the data held in the buffer 141 to the host device 200 in a case where the stored connection destination matches the connection destination included in the communication request.

(Buffer Control)

Since a capacity of the buffer 141 is limited, there might be a case where all data received by the radio communicator 131 cannot be held in the buffer 141 in a case where data transfer to the host device 200 is impossible.

Figure 4:
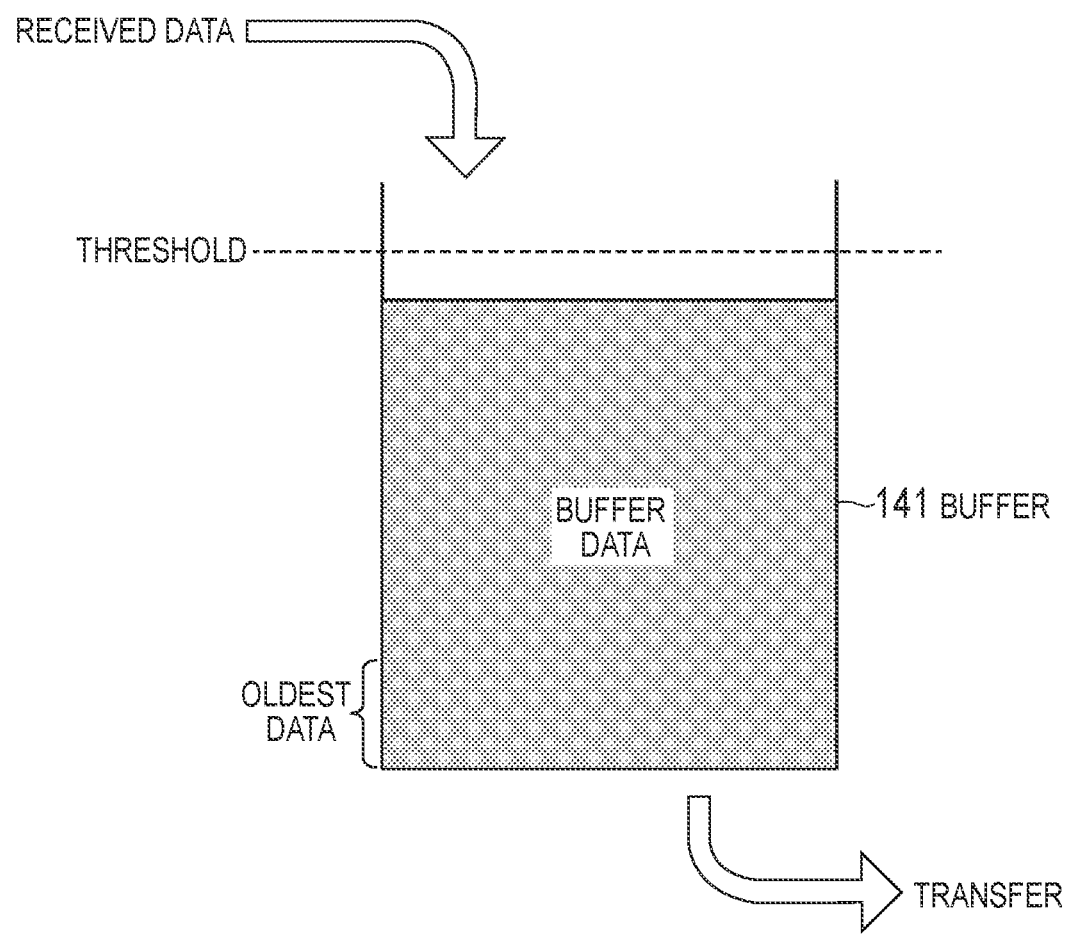
FIG. 4 is a diagram illustrating buffer control according to the embodiment.

FIG. 4 is a diagram illustrating buffer control according to an embodiment. As illustrated in FIG. 4, the buffer 141 is a First In, first out (FIFO) buffer. The transfer controller 132 transfers the data held in the buffer 141 to the host device 200 in ascending order from the oldest. Prolonging the data transfer impossible period would increase the amount of data held in the buffer 141.

The transfer controller 132 compares the amount of data held in the buffer 141 with a threshold determined in accordance with the capacity of the buffer 141. The threshold may be the maximum capacity of the buffer 141 or a value smaller than the maximum capacity of the buffer 141.

In a case where the amount of data stored in the buffer 141 exceeds the threshold, the transfer controller 132 discards data newly received by the radio communicator 131 while maintaining the data already held in the buffer 141. This enables old data to be protected instead of being discarded.

Alternatively, in a case where the amount of data held in the buffer 141 exceeds a threshold, the transfer controller 132 causes the buffer 141 to hold the data newly received by the radio communicator 131 while discarding the oldest data held in the buffer 141. For example, after the amount of data held in the buffer 141 exceeds a threshold, the transfer controller 132 discards the same amount of data as the amount of received data in the buffer 141 in the ascending order from the oldest each time the radio communicator 131 newly receives data. This enables new data to be protected instead of being discarded.

It is allowable to configure whether to protect old data or new data onto the LPWA communication apparatus 100 via the host device 200 at the time of initial configuration of the LPWA communication apparatus 100, for example. According to the configuration made from the host device 200, the LPWA communication apparatus 100 selects whether to protect old data or protect new data, as operation taken in a case where the amount of data held in the buffer 141 exceeds a threshold.

(Example of Operation of Communication System)

Figure 5:
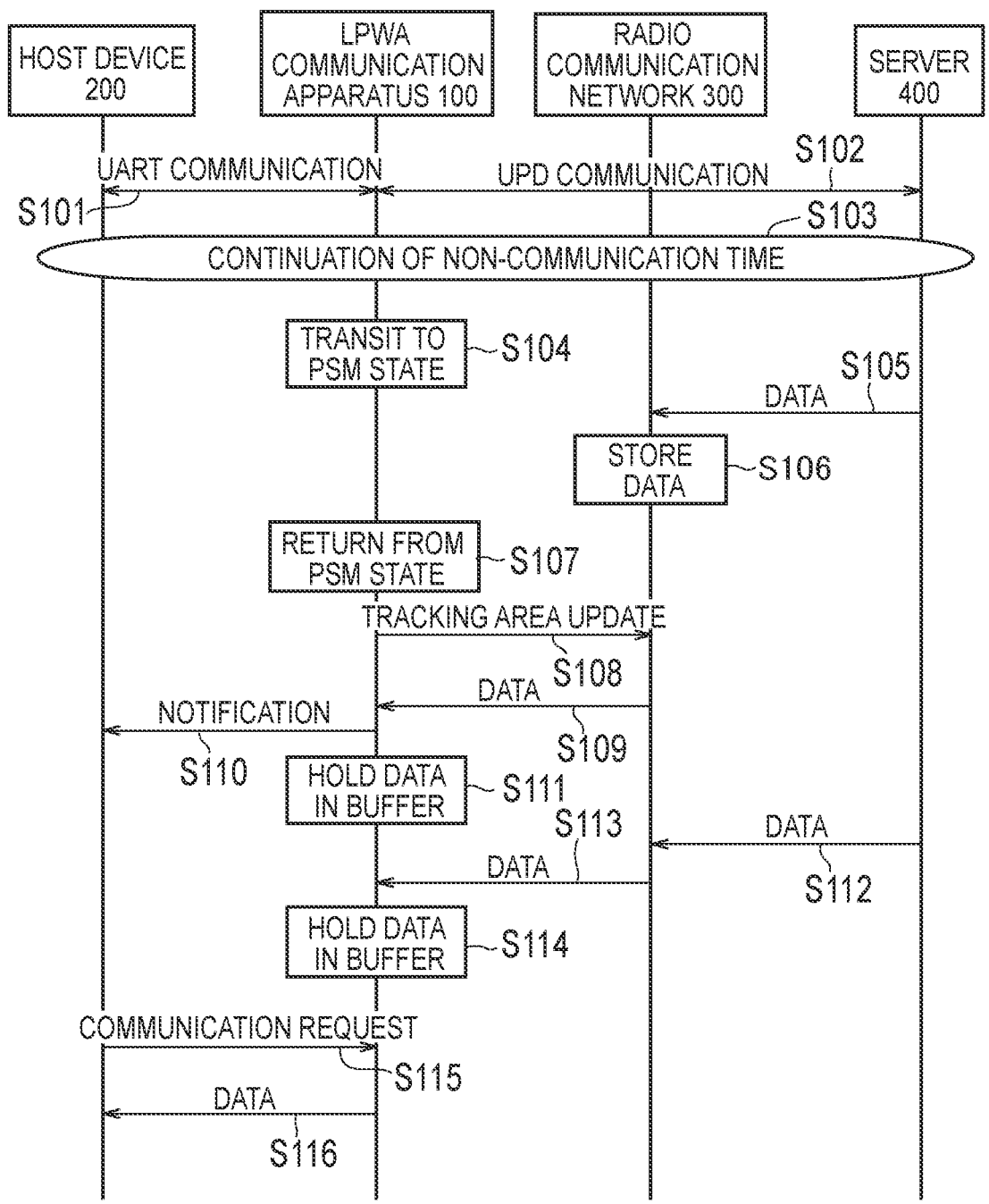
FIG. 5 is a diagram illustrating an example of operation of a communication system according to the embodiment.

FIG. 5 is a diagram illustrating an example of operation of the communication system 1 according to an embodiment. Here, operation in a case where the power saving state is the PSM state will be described.

As illustrated in FIG. 5, in step S101, the host device 200 and the LPWA communication apparatus 100 perform UART communication. In step S102, the LPWA communication apparatus 100 and the server 400 perform UDP communication via the radio communication network 300. Note that the LPWA communication apparatus 100 is in a connected state of having a radio connection with the radio communication network 300. The LPWA communication apparatus 100 includes the timer values for the PSM state (on first and second timers described below) in an attach request message and a tracking area update message transmitted to the MME 320. The attach request message is a NAS message used when connecting to the radio communication network 300. The tracking area update message is a NAS message for notifying that the tracking area has been changed. The MME 320 grasps the timer values for the PSM state on the basis of these NAS messages.

In step S103, there is no more data to be transmitted and received between the LPWA communication apparatus 100 and the server 400, leading to continuation of the connected state. The radio communication network 300 releases the radio connection with the LPWA communication apparatus 100 and transitions the LPWA communication apparatus 100 to an idle state. The LPWA communication apparatus 100 and the MME 320 detect the transition to the idle state and activate a first timer (for example, T3324 in 3GPP) that determines the time to transition to the PSM state. Moreover, a second timer (for example, T3412 in 3GPP) that determines the time at which the PSM state is released and the tracking area update message is transmitted is also in operation.

In step S104, the LPWA communication apparatus 100 transitions to the PSM state when the first timer expires. In response to the transition of the LPWA communication apparatus 100 to the PSM state, the MME 320 instructs the GW 330 to store data for the LPWA communication apparatus 100.

In step S105, the server 400 transmits data addressed to the host device 200 (LPWA communication apparatus 100) to the radio communication network 300.

In step S106, the GW 330 of the radio communication network 300 stores data transmitted from the server 400.

In step S107, when the second timer expires, the LPWA communication apparatus 100 returns from the PSM state and resumes radio communication.

In step S108, the LPWA communication apparatus 100 establishes a radio connection with the radio communication network 300 and transmits a tracking area update message to the MME 320. In accordance with the reception of the tracking area update message from the LPWA communication apparatus 100, the MME 320 detects that the LPWA communication apparatus 100 has returned from the PSM state. The MME 320 instructs the GW 330 to transmit the stored data to the LPWA communication apparatus 100.

In step S109, the GW 330 transmits the stored data to LPWA communication apparatus 100 via the base station 310.

In step S110, the LPWA communication apparatus 100 transmits to the host device 200 notification indicating that there is data to be transferred to the host device 200.

In step S111, the LPWA communication apparatus 100 holds the data received from the radio communication network 300 in the buffer 141.

In step S112, server 400 transmits data addressed to the LPWA communication apparatus 100 to the radio communication network 300.

In step S113, the radio communication network 300 transfers the data received from the server 400 to the LPWA communication apparatus 100.

In step S114, the LPWA communication apparatus 100 holds the data received from the radio communication network 300 in the buffer 141.

In step S115, the LPWA communication apparatus 100 receives a communication request from the host device 200.

In step S116, the LPWA communication apparatus 100 transfers the data held in the buffer 141 to the host device 200.

(Summary of Embodiments)

In a case where data transfer to the host device 200 is impossible when the LPWA communication apparatus 100 resumes radio communication after a lapse of a predetermined time from the transition to the power saving state, the LPWA communication apparatus 100 causes the buffer 141 to hold the data received by the radio communicator 131 until data transfer to the host device 200 is enabled. This can prevent occurrence of data that fails to be delivered to the host device 200 particularly when using UDP, making it possible to avoid a degradation of reliability in communication.

In a case where data transfer to the host device 200 is impossible at resumption of radio communication, the LPWA communication apparatus 100 transmits to the host device 200 notification indicating that there is data to be transferred to the host device 200. This makes it possible to prompt the host device 200 to be in a data receivable state.

Furthermore, in a case where the amount of data stored in the buffer 141 exceeds a threshold, the transfer controller 132 discards data newly received by the radio communicator 131 while maintaining the data already held in the buffer 141. This enables old data to be protected instead of being discarded.

Alternatively, in a case where the amount of data held in the buffer 141 exceeds a threshold, the transfer controller 132 causes the buffer 141 to hold the data newly received by the radio communicator 131 while discarding the oldest data held in the buffer 141. This enables new data to be protected instead of being discarded.

(Modification of Embodiment)

The above-described embodiment is an example in which data already held in the buffer 141 or newly received data is discarded in a case where the amount of data held in the buffer 141 exceeds a threshold.

In a modification of the embodiment, the radio communicator 131 of the LPWA communication apparatus 100 transmits to the radio communication network 300 (MME320) a NAS message that stops or delays transmission of data to the LPWA communication apparatus 100, on the basis of the amount of data held in the buffer 141. This makes it possible to prevent overflow of the buffer 141 without discarding the data already held in the buffer 141 or newly received data.

Figure 6:
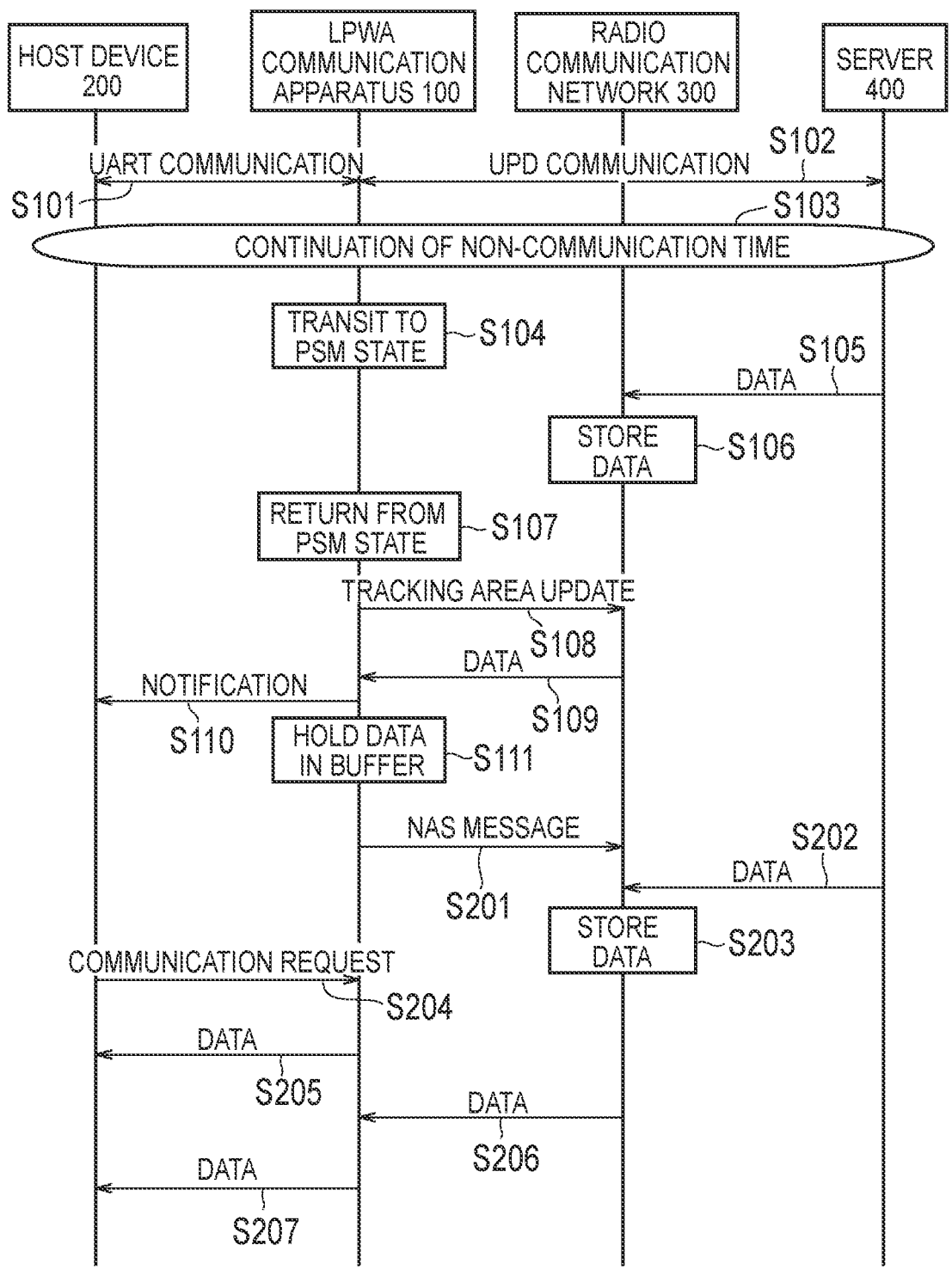
FIG. 6 is a diagram illustrating an example of operation of a communication system according to a modification of the embodiment.

FIG. 6 is a diagram illustrating an example of operation of the communication system 1 according to a modification of the embodiment. Here, differences from the above-described embodiment will be described.

As illustrated in FIG. 6, operation in steps S101 to S111 is similar to those in the above-described embodiment. In step S111, the LPWA communication apparatus 100 holds the data received from the radio communication network 300 in the buffer 141. Here, the LPWA communication apparatus 100 determines that the amount of data held in buffer 141 exceeds a threshold.

In step S201, the LPWA communication apparatus 100 transmits to the radio communication network 300 (MME 320) a NAS message that stops or delays data transmission to the LPWA communication apparatus 100. The NAS message that delays data transmission may include information (timer value) that specifies the time during which the radio communication network 300 should wait for data transmission to the LPWA communication apparatus 100. In response to the NAS message, the MME 320 instructs the GW 330 to store data for the LPWA communication apparatus 100.

In step S202, the server 400 transmits data addressed to the LPWA communication apparatus 100, to the radio communication network 300.

In step S203, the GW 330 stores the data transmitted from the server 400.

In step S204, the LPWA communication apparatus 100 receives a communication request from the host device 200.

In step S205, the LPWA communication apparatus 100 transfers the data held in the buffer 141 to the host device 200.

The LPWA communication apparatus 100 may transmit, to the MME 320, a NAS message to restart transmission of data to the LPWA communication apparatus 100, in response to the reception of a communication request from the host device 200 or at the timing at which the buffer 141 becomes empty.

In step S206, the GW 330 transmits the stored data to the LPWA communication apparatus 100 via the base station 310.

In step S207, the LPWA communication apparatus 100 transfers the data received from the radio communication network 300 to the host device 200.

(Other Embodiments)

Although the embodiments have been described above, it should not be understood that the description and drawings forming part of this disclosure limit the present invention. From this disclosure, various alternative embodiments, examples and operational techniques will be apparent to those skilled in the art.

While the embodiment has described an example in which the LPWA scheme is the eMTC scheme or the NB-IoT scheme, an LPWA scheme other than the eMTC scheme and the NB-IoT scheme may be used.

The embodiment has described an example in which the LPWA communication apparatus 100 is connected to the host device 200. Alternatively, however, the LPWA communication apparatus 100 may be used in a state not being connected to the host device 200. For example, the LPWA communication apparatus 100 may periodically acquire a sensor value output by the sensor 170 and transmit the sensor value to the server 400.

The modification of the embodiment has described an example in which the LPWA communication apparatus 100 transmits to the radio communication network 300 a NAS message that stops or delays transmission of data to the LPWA communication apparatus 100, on the basis of the amount of data held in the buffer 141. However, the LPWA communication apparatus 100 may transmit, to the radio communication network 300, the NAS message that stops or delays the transmission of data to the LPWA communication apparatus 100, regardless of the state of the buffer 141. For example, the LPWA communication apparatus 100 may transmit the NAS message to the radio communication network 300 in a case where data transfer to the host device 200 is impossible when the radio communicator 131 resumes radio communication.

The invention claimed is:

1. A radio communication apparatus connected to a host device, comprising:
a radio communicator configured to perform a radio communication with a radio communication network by a low power wide area (LPWA) scheme, receive, from the radio communication network, data transmitted using a user datagram protocol (UDP), and transition to a power saving state in which the radio communication is stopped during a period occurring no data communication; and
a transfer controller configured to transfer, to the host device, the data received by the radio communicator,
wherein data that is addressed to the radio communication apparatus is to be stored on a side of the radio communication network during a period in which the radio communicator is in the power saving state,
the radio communicator is configured to receive the stored data when the radio communication resumes after the transitioning to the power saving state,
the transfer controller is configured to determine that the data transfer to the host device is impossible until reception of a communication request from the host device, and
the transfer controller is configured to cause a buffer to hold the data transmitted from the radio communication network and received by the radio communicator, and transmit, to the host device, notification indicating that there is data to be transferred to the host device when data transfer to the host device is impossible when the radio communicator resumes the radio communication.

2. The radio communication apparatus according to claim 1, wherein the transfer controller is configured to discard data newly received by the radio communicator while maintaining data already held in the buffer when an amount of data held in the buffer exceeds a threshold determined in accordance with a capacity of the buffer.

3. The radio communication apparatus according to claim 1, wherein the transfer controller is configured to cause the buffer to hold data newly received by the radio communicator while discarding the oldest data held in the buffer, when an amount of data held in the buffer exceeds a threshold determined in accordance with a capacity of the buffer.

4. The radio communication apparatus according to claim 1, wherein the radio communicator is configured to transmit, to the radio communication network, a non-access stratum (NAS) message that stops or delays transmission of data to the radio communication apparatus, based on an amount of data held in the buffer.

5. The radio communication apparatus according to claim 1, wherein
the transfer controller is configured to determine whether the data transfer to the host device is enabled based on a power-on state of the host device and an application start-up state of the host device.

6. A method in a radio communication apparatus connected to a host device, the method comprising:
performing a radio communication with a radio communication network using a low power wide area (LPWA) scheme;
receiving, from the radio communication network, data transmitted using a user datagram protocol (UDP);
determining that the data transfer to the host device is impossible until reception of a communication request from the host device;
transitioning to a power saving state in which the radio communication is stopped during a period occurring no data communication, such that data that is addressed to the radio communication apparatus is to be stored on a side of the radio communication network during a period in which the radio communicator is in the power saving state;
receiving the stored data when resuming the radio communication,
transferring the received data to the host device;
causing a buffer to hold the data transmitted from the radio communication network and received from the radio communication network when data transfer to the host device is impossible; and
transmitting, to the host device, notification indicating that there is data to be transferred to the host device.

* * * * *